United States Patent [19]

Barrows

[11] Patent Number: 5,517,174
[45] Date of Patent: * May 14, 1996

[54] WATER ALARM AND METHOD OF USING SAME

[75] Inventor: Jon Barrows, Brandon, Vt.

[73] Assignee: Waterbug Systems, Inc., Brandon, Vt.

[ * ] Notice: The portion of the term of this patent subsequent to Oct. 4, 2013, has been disclaimed.

[21] Appl. No.: 261,708

[22] Filed: Jun. 17, 1994

Related U.S. Application Data

[63] Continuation-in-part of Ser. No. 130,877, Oct. 4, 1993.
[51] Int. Cl.$^6$ ................................................. G08B 21/00
[52] U.S. Cl. ........................... 340/431; 340/573; 340/604; 403/109
[58] Field of Search ................................. 340/431, 573, 340/604, 605, 618, 620, 611, 623, 616, 615, 984; 248/316.3, 311.2, 188.5; 74/527; 403/105, 109

[56] References Cited

U.S. PATENT DOCUMENTS

| | | | |
|---|---|---|---|
| 559,368 | 5/1896 | Dieterich | 403/105 |
| 1,191,301 | 7/1916 | Guthat | 403/105 |
| 1,320,613 | 4/1919 | Gilcrease | 403/105 |
| 1,774,869 | 9/1930 | Brown | 403/105 |
| 1,831,613 | 11/1931 | Symons | 403/105 |
| 3,585,582 | 6/1971 | Dove | 340/431 |
| 4,065,959 | 1/1978 | Richardson | 73/56 |
| 4,528,622 | 7/1985 | Bacevius | 362/396 |

OTHER PUBLICATIONS

Catalogue of "Save Plus Pool Alarm", Spring 1994. Listed on the Back Cover of the Catalogue.

*Primary Examiner*—Brent A. Swarthout
*Assistant Examiner*—Nina Tong
*Attorney, Agent, or Firm*—Burns, Doane Swecker & Mathis

[57] ABSTRACT

A sensor includes a hollow tube having first and second ends; a cap secured at said first end; said second end being substantially open to allow fluid to enter the tube; a floatation element slidably arranged within said tube; means at said second end for preventing the floatation element from leaving said tube; a contact switch arranged within said tube between said cap and said floatation element; and a fluid exhaust means provided in said tube adjacent said contact switch. The sensor may be used to detect a motion or displacement of water in a swimming pool.

17 Claims, 3 Drawing Sheets

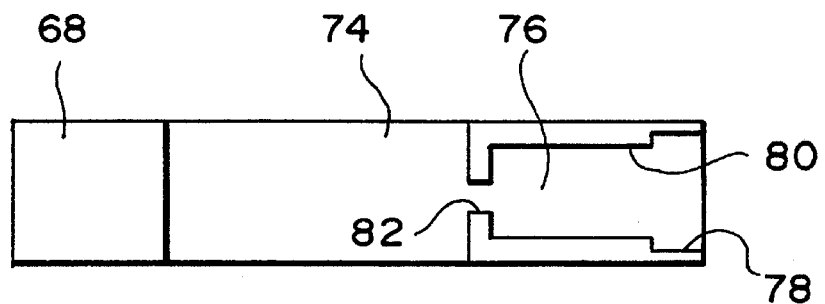
FIG. 5
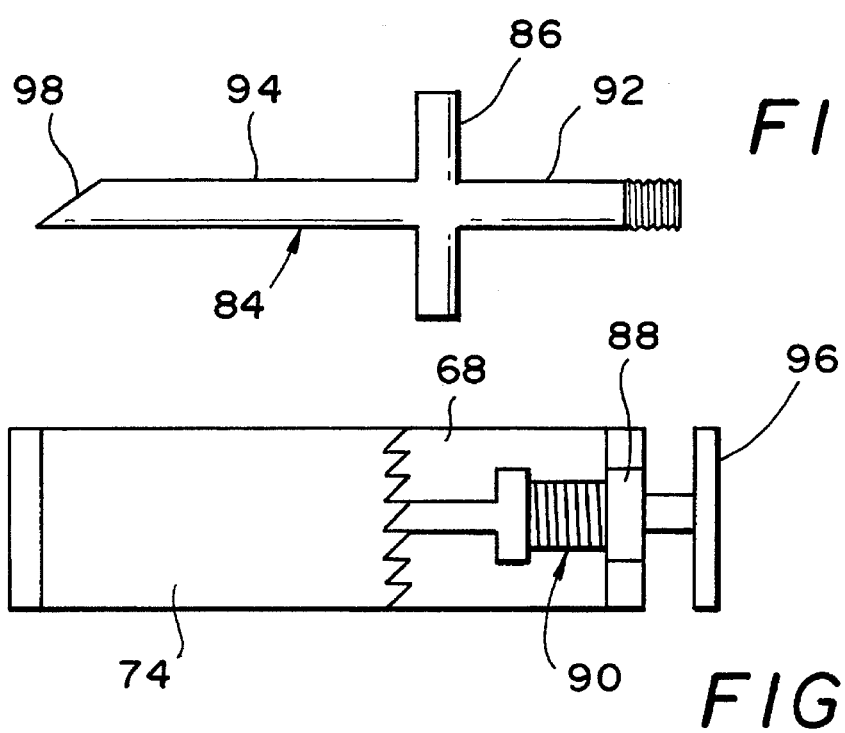
FIG. 6
FIG. 7
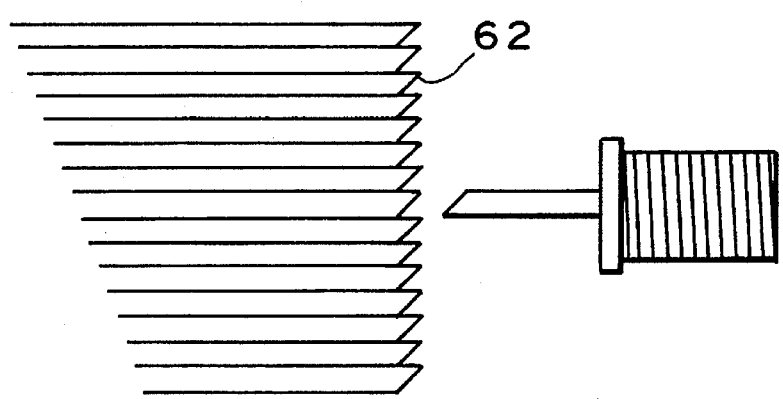
FIG. 8

WATER ALARM AND METHOD OF USING SAME

CROSS-REFERENCE TO RELATED APPLICATIONS

This application is a continuation-in-part application of U.S. Ser. No. 08/130,877, entitled Water Level Sensor, Trailer Using Same and Method of Using Trailer, filed on Oct. 4, 1993. The subject matter of that application is incorporated herein by reference.

BACKGROUND OF THE INVENTION

1. Field of the Invention

The present invention relates to a sensor for detecting changes in water levels. The sensor has numerous applications, such as a sensor for determining motion in a swimming pool or bath tub, which may be caused by a small child falling into the pool.

2. Discussion of Related Art

Water level sensors have been known in the art for some time. However, the present invention relates to a relatively simple design that can be easily made at a low cost and simply connected to an electrical circuit for providing an appropriate warning signal.

In addition, the present invention is useful for solving problems heretofore experienced with people, particularly children entering or falling into swimming pools or bathtubs without proper supervision.

It is also useful for detecting increases in water levels that may occur as a result of a flood or plumbing leak. To this end, the invention may be used in a basement or even in some locations outside of a house or building.

SUMMARY

The present invention may be used to detect water motion or the displacement of water in a swimming pool, bathtub, or similar location. It may be used to signal an alarm when a small child or other object falls into a swimming pool, bathtub, or similar location.

In another embodiment of the present invention, the sensor can be used by fishermen or boat owners that enables them to detect the depth of water between high or low tide.

A sensor according to the present invention includes a hollow tube having first and second ends; a cap secured at said first end; said second end being substantially open to allow fluid to enter the tube; a floatation element slidably arranged within said tube; means at said second end for preventing the floatation element from leaving said tube; a contact switch arranged within said tube between said cap and said floatation element; and a fluid exhaust means provided in said tube adjacent said contact switch. The sensor may further include adjustable means for supporting the sensor.

BRIEF DESCRIPTION OF THE DRAWINGS

FIG. 5 is a side view of a portion of the bracket of FIG. 4;

FIG. 6 is a view of a locking pin;

FIG. 7 is a side view of the bracket of FIG. 4 having the locking pin of FIG. 6 mounted therein; and FIG. 8 is an enlarged view illustrating the relationship between the locking pin and the locking pin grooves.

DETAILED DESCRIPTION OF PREFERRED EMBODIMENTS

Figure 1:
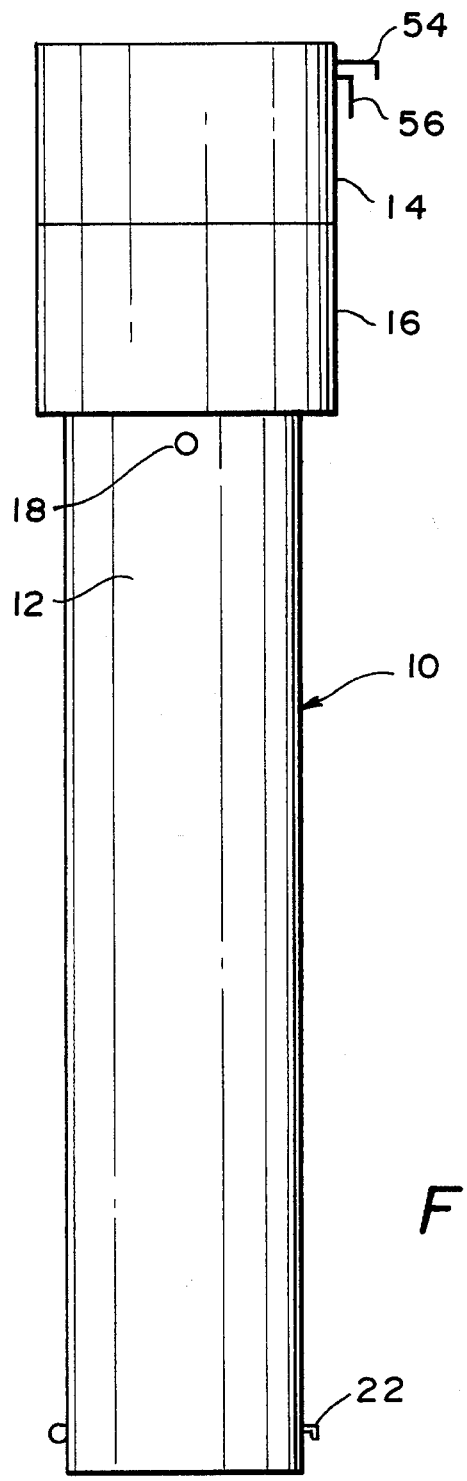
FIG. 1 is a view of a water level sensor according to the present invention.
Figure 2:
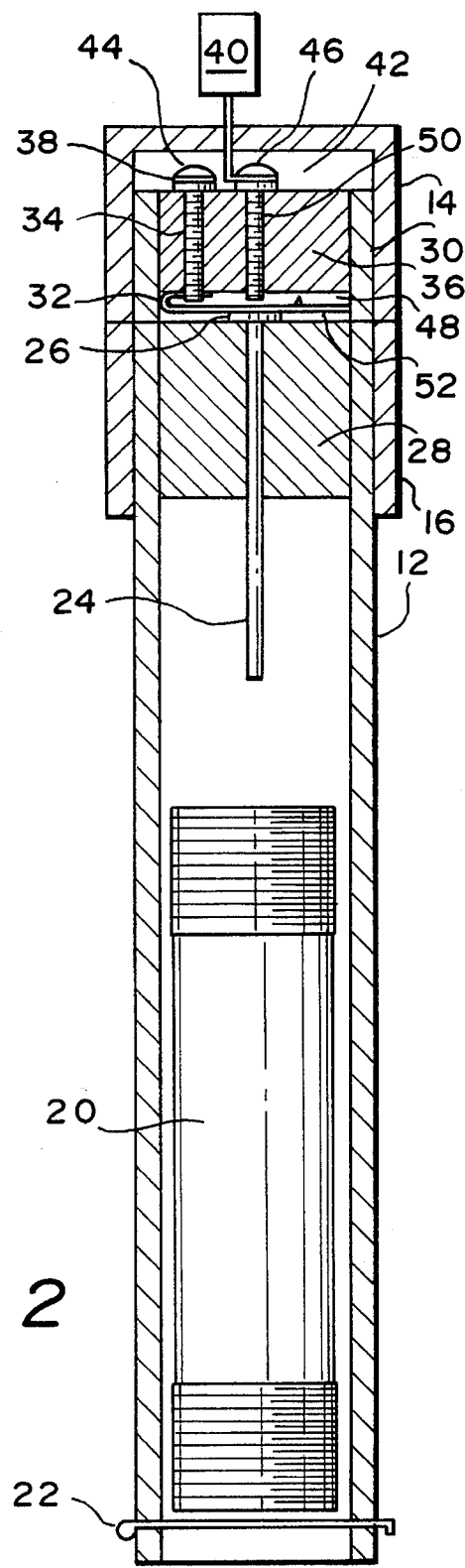
FIG. 2 is a partial cross-sectional view of the sensor of FIG. 1.
Figure 3:
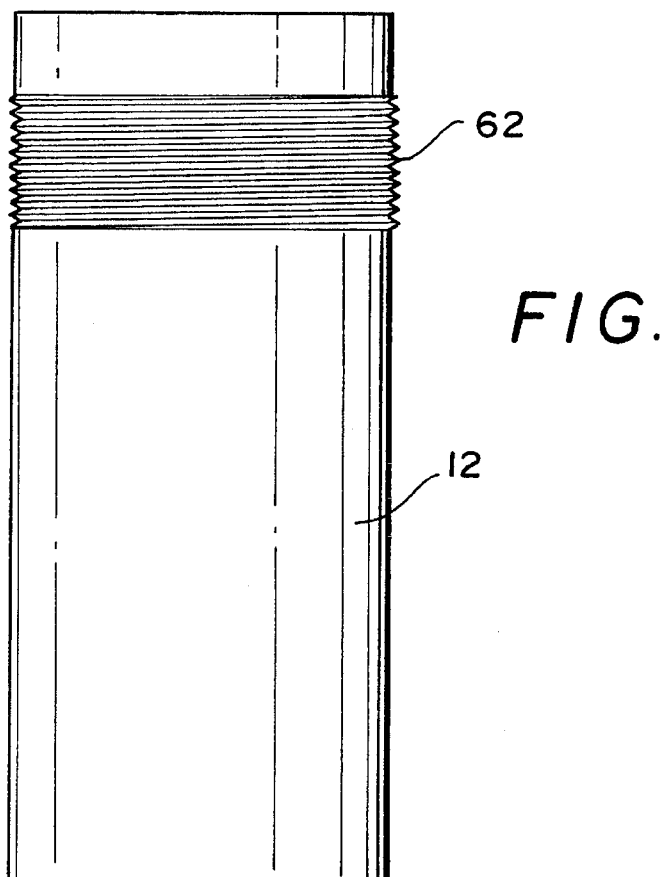
FIG. 3 is a view of a tube of the sensor according to the present invention including a float ring and locking pin grooves.

According to one preferred embodiment of the present invention, a float sensor 10 includes a cylindrical tube 12 having an opened end. At the other end of the tube 12 is a two piece cap 14, 16. A floating element 20 is designed to fit loosely within the tube 12 so that the floating element 20 may move within the tube 12, as necessary, to accommodate changes in water levels. A retaining pin 22 extends through the tube 12 at the open end thereof in order to retain the floating element 20 within the tube 12.

A fluid exhaust means in the form of an opening 18 is provided within the tube 12 at an end of the tube opposite the open end in order to allow air to exit or enter the tube 12 as the floating element 20 moves within the tube 12.

Situated within the tube 12 at the end thereof that is sealed by the cap 14, 16 is a plug 28. The plug 28 has a bore extending axially through the center thereof for slidably guiding the movement of a pin 24. The pin 24 has an enlarged head 26 at one end thereof. The head 26 of the pin 24 prevents the pin from passing completely through the plug 28 into the main portion of the tube 12.

A second plug 36 is also disposed in the end of the tube 12 that is sealed by the cap 14, 16, and defines a chamber 48 between the two plugs 28, 36. The plug 36 includes two bores for retaining bolts 34, 50, respectively.

The head of the first bolt 34 passes through an opening in a U-shaped metal clip 32 in order to retain the metal clip 32 in the chamber 48. The first bolt 34 is secured at the opposite side of plug 36 by a pair of nuts 38.

The second bolt 50 extending through plug 36 is located such that the head of the bolt 50 is located in alignment with an extended portion of the U-shaped clip 32 so that when the extended portion of the U-shaped clip is depressed it contacts the head of the second bolt 50. When the extended portion of the U-shaped clip 32 contacts the bolt 50, a circuit is completed between the two bolts 34, 50.

Preferably the second bolt 50 is mounted in the center of the plug 36, and is in alignment with the pin 24 that extends through the first plug 28. The second bolt 50 is secured by a pair of nuts 46.

In the space 42 provided at the top of plug 36, wires 54, 56 are respectively secured to the first and second bolts by nuts 44, 46. The wires 54, 56 pass through specially provided openings in the cap 14 in a water tight manner.

The second plug 36 is also fixed within the tube 12 in a water tight manner so that water cannot pass beyond the plug 36 into the space 42 above the plug.

To prevent water from passing beyond the first plug 28 and contacting the U-shaped clip 32, a thin film 52 of water tight material, such as plastic, may be secured within the tube 12 between the head of the pin 24 and the U-shaped clip 32. As a result, any water that passes through the first plug 28 through the central bore therein is prevented from contacting the U-shaped clip 32 and thus possibly corroding the contacts therein.

In this application and drawings, a simple contact switch is disclosed that is both economical and reliable. However, without departing from the teachings of the present invention, numerous other types of switches may be employed.

According to one embodiment of the present invention, the above described sensor 10 can be mounted to a wall of a swimming pool, bathtub, or similar structure. The sensor 10 is mounted at a position on the wall so that when the water level in the swimming pool, bathtub, or similar structure has risen above a certain level, water enters through the bottom of the tube 12 and causes the floating element 20 to rise through the tube 12, thus forcing pin 24 to close the contacts.

The wires 54, 56 connected to the contacts and extending from the cap may be connected to a control mechanism 40 that can be used to activate an indicator or an alarm system. The control mechanism 40 can be set so that a short temporary closing of the contacts will enable an indicator to be activated for a predetermined period of time that is greater than the period of time for which the contacts are closed. Such control mechanisms are well known to those of ordinary skill in the art. Accordingly, further details of such control mechanisms are hereby omitted.

The control mechanism 40 can be connected to features already present within a house, such as a horn or an illuminatable feature so that an indication can be made when the water level rises above a predetermined level.

The sensor 10 can be designed to operate an indication signal from a portable battery, from a car battery, or from some other power source.

In this embodiment, the tube 12 is fixed to an edge surface of the pool so that the floating element 20 is close to the plunger 24. If an object or child falls into the pool, ripples or waves will be created, or a certain amount of water will be displaced, that will raise the floating element 20 into contact with the plunger 24, thus triggering the contacts 32.

To account for variations in the water level in the pool, the tube 12 may be fixed to the edge of the pool in an adjustable manner, so that the tube 12 can be raised or lowered to account for variations in water level. Alternatively, the contacts 32 can be mounted within the tube 12 within an adjustable manner so that the contact switch may be raised or lowered within the tube 12.

FIGS. 3–8 illustrate an arrangement for mounting the sensor 10 to a wall, such as a wall of a swimming pool, in an adjustable manner. According to this arrangement, a float ring 60 is fixed to an outer portion of the tube 12. Locking pin grooves 62 are formed on the tube 12 at a separate location. See FIG. 3.

Figure 4:
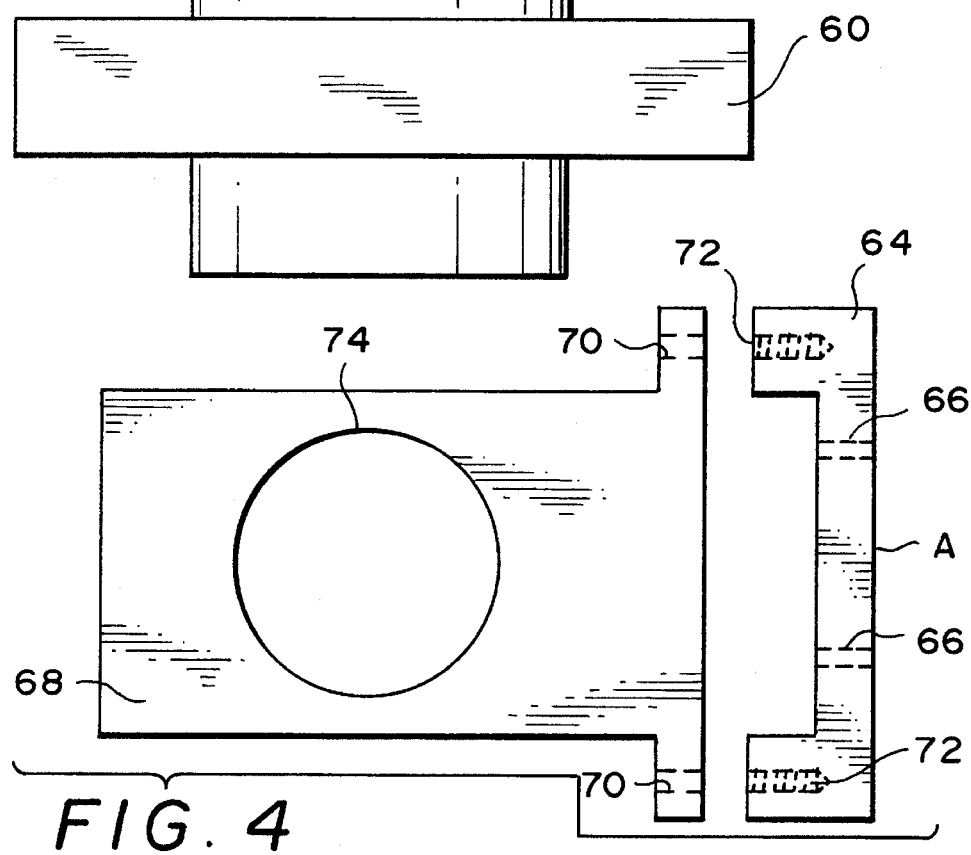
FIG. 4 is a top view of a bracket used to mount the sensor to a wall of a swimming pool.

Turning attention now to FIG. 4, a first bracket 64 is provided with at least two bores 66. Screws (not shown) or other fastening means can be used to mount side A of the first bracket 64 to a wall of a swimming pool. A second bracket 68 (FIGS. 4, 5, and 7) can be fastened to the first bracket 64 with screws or other fastening means through bores 70, 72. The second bracket 68 includes a large opening 74, through the tube 12 fits.

The second bracket 68 includes a locking pin chamber 76 extending from side B through to the large opening 74. The chamber 76 includes a threaded portion 78, a central portion 80, and an inner portion 82. See FIG. 5.

Turning attention now to FIG. 6, a locking pin 84 includes a spring retaining wall 86. A tension spring 90 is mounted on a first shaft 92 of the locking pin 84. The locking pin 84 and tension spring 90 are then placed in the locking pin chamber 76 with the second shaft 94 of the locking pin 84 extending through the inner portion 82 of the locking pin chamber 76. A washer 88 having external threads on the outer diameter thereof is threaded into the threaded portion 78 of the locking pin chamber 76 so as to secure the locking pin 84 and tension spring 90 within the locking pin chamber 76.

A thumb release nut 96 is threaded onto the end of the first shaft 92 of the locking pin 84. By grasping the thumb release nut 96 and pulling the locking pin 84 in an axial direction out of the locking pin chamber 76, the locking pin 84 can be pulled outwardly against the force of the tension spring 90.

The locking pin 84 includes a bevelled surface 98 at the end of the second shaft 94 which engages the locking pin grooves 62 of the tube 12 when the tension spring 90 urges the locking pin 84 toward the large opening 74.

As the water in a swimming pool evaporates, the level of the water decreases. The height of the tube 12 is controlled by the water level because the tube 12 floats on the surface of the water by means of the float ring 60. As the water level decreases slowly, for example, due to evaporation, the locking pin 84 enables the tube 12 to ratchet down. However, because of the shape of the bevelled surface 98 of the locking pin 84, the tube is not able to move upwardly with respect to brackets 64 and 68. To raise the tube 12 with respect to the brackets 64 and 68, it is necessary to grasp the thumb release nut 96 and pull the locking pin 84 outwardly enough so that the bevelled surface 98 is no longer in engagement with the locking pin grooves 62. Thus, the sensor 10 can automatically adjust for a gradual lowering of the water level in the pool by the disclosed ratchet mechanism. Furthermore, the sensor position can be reset when the pool is refilled by using the thumb release nut 96.

Of course, alternative conventional ratchet mechanisms can be used instead of the specific embodiment disclosed herein.

When the sensor 10 is used in a bathtub, the sensor can detect if a person enters the bathtub (through the displacement of the water). In addition, the sensor 10 can also be used to monitor the water level of the bathtub when the tub is being filled. If the water level rises above a certain level during the filling of the bathtub, the sensor 10 can be activated.

The sensor can also be used in the basement of a house that is subject to flooding. If the sensor is mounted at a low level in the basement, an alarm can be activated if water accumulates in the basement.

The sensor 10 can also be placed in other locations, such as on or near river banks, dams, levees, trees, or poles in order to detect floods or similar water level problems.

When in use as a motion or displacement detector in a swimming pool, the sensor 10 may be connected to any type of indication means such as an alarm or light system. In one embodiment, the sensor 10 can be connected to an indication means already in use in the house, such a smoke detector or burglar alarm.

The sensor 10 may also include a control mechanism so that a brief closing of the contacts will enable an alarm or indication to continue for aperiod of time longer than the closure of contacts.

In yet another embodiment of the present invention, the sensor can be used in an oceanic body of water to monitor tides and or waves. For example, the sensor 10 can be fastened to a dock, or some other stable structure for monitoring changes in the level of the water. In such an embodiment, the contact switch described above may be replaced with a type of sensor that indicates the relative position of the floating element 20 within the tube 12, rather than just triggering a signal when the floating element 20 reaches a predetermined point.

In yet another embodiment, the sensor 10 can be used within large liquid storage tanks, such as gasoline or oil tanks to monitor the level of the liquid in the tank. In some cases, two sensors 10 may be used. One sensor 10 can be placed at an upper level to indicate when the liquid reaches a maximum or desired level. A second sensor 10 can be placed at a lower level and can be used to indicate when the liquid falls below a certain level, and thus needs refilling.

As should now be clear, the sensor 10 of the present invention is an extremely efficient and versatile device that can be used in a vast number of applications.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A water alarm, comprising:

a sensor for detecting an increase in a level of water; and means for fastening said sensor to a fixed surface at a location such that the sensor will contact the water if the water level rises above a predetermined distance;

said sensor includes:

a hollow tube;

floatation element slidably arranged within said tube; and a plunger arranged between said contact switch and said floatation element;

a contact switch arranged within said tube between an upper end of said tube and said floatation element, wherein said contact switch comprising a U-shaped clip comprising two asymmetric legs, and a contact, said clip and said contact is aligned with an extension of said clip, so that when said floatation element moves toward said upper end of said tube, the plunger presses against said clip, and said clip is depressed against said contact to complete a circuit therebetween.

2. The water alarm of claim 1, wherein the hollow tube has a lower end; and further comprising a cap secured at said upper end;

said lower end being substantially open to allow fluid to enter the tube;

means at said lower end for preventing the floatation element from leaving said tube; and a fluid exhaust means provided in said tube adjacent said contact switch.

3. The water alarm of claim 2, further comprising:

a plug arranged within said tube between said fluid exhaust means and said contact switch, said plug including a bore extending axially through said plug;

said plug defining a chamber in said tube between said plug and said cap;

a plunger having a head at one end thereof and a stem at a second end thereof, said plunger extending through said bore so that the head of the plunger is in the chamber and the stem of the plunger extends from the plug away from said chamber;

said contact switch being mounted within said chamber in alignment with the head of said plunger so that when said floatation element floats toward said upper end of said tube, said floatation element engages said plunger stem causing said plunger to trip said contact switch.

4. The water alarm of claim 3, further comprising a watertight seal arranged between said plunger and said contact switch.

5. The water alarm of claim 1, wherein the fixed surface is an interior wall of a swimming pool.

6. The water alarm of claim 1, wherein the fastening means is adjustable so that the height of the sensor can be changed.

7. The water alarm of claim 1, wherein the fixed surface is an interior wall in a basement.

8. A water alarm, comprising:

a sensor for detecting an increase in a level of water;

means for fastening said sensor to a fixed surface at a location such that the sensor will contact the water if the water level rises above a predetermined distance;

said sensor includes:

a hollow tube having first and second ends;

a cap secured at said first end;

said second end being substantially open to allow fluid to enter the tube;

a floatation element slidably arranged within said tube;

means at said second end for preventing the floatation element from leaving said tube;

first and second contacts arranged within said tube at said first end; wherein said first contact is a U-shaped clip comprising two asymmetric legs, and said second contact is aligned with an extension of said first contact;

a plunger arranged between said contacts and said floatation element;

said first and second contacts being spaced axially from each other and arranged in alignment with said floatation element so that when said floatation element moves toward said first end the plunger is pressed against said first contact and first contact is depressed against said second contact to complete a circuit therebetween;

a fluid exhaust means provided in said tube adjacent said contact switch.

9. The water alarm of claim 8, further comprising a watertight seal arranged between said floatation element and said first and second contacts.

10. The water alarm of claim 8, wherein the fixed surface is an interior wall of a swimming pool.

11. The water alarm of claim 8, wherein the fixed surface is an interior wall of a bathtub.

12. The water alarm of claim 8, wherein the fixed surface is an interior wall in a basement.

13. A water level alarm for a body of water, comprising:

a sensor for detecting an increase in the water level; said sensor secured adjacent to a ratcheting means;

means for fastening said sensor to an object that is fixed with respect to the water level, said fastening means including means for enabling said sensor to automatically ratchet down by its own weight to a lower level when said water level is lowered and for preventing said sensor from rising when said water level rises; and means for disengaging said preventing means so as to raise said sensor.

14. The water level alarm of claim 13, wherein said sensor includes:

a hollow tube;

a floatation element slidably arranged within said tube; and a contact switch arranged within said tube between an upper end of said tube and said floatation element so that said contact switch is activated if said floatation element floats to the upper end of the tube.

15. The water level alarm of claim 13, wherein said fastening means includes:

a floatation element mounted on said sensor;

a grooved surface on said sensor;

a bracket mounted to said object;

an pin mounted within said bracket with a biasing force urging the pin against the grooved surface, said pin having an angled surface which engages with said grooved surface, said grooved surface and angled pin surface arranged in order to prevent the raising of said sensor, but which enables the sensor to slip downwardly.

16. The water level alarm of claim 15, wherein said sensor includes: a hollow tube;

a floatation element slidably arranged within said tube; and a contact switch arranged within said tube between an upper end of said tube and said floatation element so that said contact switch is activated if said floatation element floats to the upper end of the tube.

17. A method of detecting if an object falls into a pool of water, comprising the steps of:

placing a water alarm according to claim 1 on a wall of the pool containing said water;

adjusting the height of the sensor so that the sensor will be activated if a level of the water rises above a predetermined level; and monitoring said sensor to determine if said sensor is activated.

\* \* \* \* \*